United States Patent
Zuidema

(10) Patent No.: US 8,771,448 B2
(45) Date of Patent: *Jul. 8, 2014

(54) CURVATURE REDUCTION FOR SWITCHABLE POLYMER LENTICULARS

(71) Applicant: Koninklijke Philips Electronics N.V., Eindhoven (NL)

(72) Inventor: Hans Zuidema, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 2 days.

This patent is subject to a terminal disclaimer.

(21) Appl. No.: 13/771,454

(22) Filed: Feb. 20, 2013

(65) Prior Publication Data

US 2013/0160942 A1 Jun. 27, 2013

Related U.S. Application Data

(62) Division of application No. 12/376,575, filed as application No. PCT/IB2007/051304 on Apr. 11, 2007, now Pat. No. 8,398,798.

(60) Provisional application No. 60/823,386, filed on Aug. 24, 2006.

(51) Int. Cl.
B32B 37/00 (2006.01)

(52) U.S. Cl.
USPC .............................. 156/145; 264/1.7; 359/455

(58) Field of Classification Search
USPC ............ 156/145; 359/455, 456, 457; 264/1.7
See application file for complete search history.

(56) References Cited

U.S. PATENT DOCUMENTS

| 6,069,650 A | 5/2000 | Battersby |
| 8,398,798 B2 * | 3/2013 | Zuidema ....................... 156/145 |
| 2002/0090579 A1 * | 7/2002 | Chung et al. ................... 430/321 |
| 2004/0164927 A1 | 8/2004 | Suyama et al. |
| 2006/0086448 A1 | 4/2006 | Verstegen et al. |
| 2006/0098285 A1 | 5/2006 | Woodgate et al. |
| 2006/0098296 A1 | 5/2006 | Woodgate et al. |
| 2007/0019132 A1 | 1/2007 | Kim et al. |
| 2007/0109400 A1 * | 5/2007 | Woodgate et al. .............. 348/47 |

FOREIGN PATENT DOCUMENTS

| GB | 2403814 A | 1/2005 |
| GB | 2403815 A | 1/2005 |
| GB | 2403842 A | 1/2005 |
| JP | 2006189844 A | 7/2006 |
| WO | 9821620 | 5/1998 |
| WO | 03015424 A2 | 2/2003 |
| WO | WO 2005/006056 * | 1/2005 ............. G02B 27/22 |

* cited by examiner

Primary Examiner — Katarzyna Wyrozebski Lee
Assistant Examiner — Vishal I Patel

(57) ABSTRACT

A method for fabricating lenticulars includes applying a rubbing layer on a lenticular structure. The rubbing layer is baked on the lenticular structure before installation of the lenticular structure on a plate. After baking, the lenticular structure is applied to the plate.

6 Claims, 2 Drawing Sheets

CURVATURE REDUCTION FOR SWITCHABLE POLYMER LENTICULARS

This disclosure relates to electronic component manufacturing, and more particularly to display devices having improved polymer lenticulars with reduced curvature.

Polarization sensitive lenses (PS-Lenses) have been employed in many applications, e.g., to compensate for spherical aberration in display devices. Such lenses can be formed of a birefringent material, such as a liquid crystal. Birefringence denotes the presence of different refractive indices for the two polarization components of a beam of light. Birefringent materials have an extraordinary refractive index ($n_e$) and an ordinary refractive index ($n_o$), with the difference between the refractive indices being $\Delta n_e-n_o$. PS lenses can be used to provide different focal points for a single or different wavelength(s) by ensuring that the same or different wavelengths are incident upon the lens with different polarizations.

To form the lens with desired optical properties, the liquid crystal molecules need to be directed in a specific orientation. Materials to induce this orientation may include polyimides. Polyimides (PI) are usually applied via spincoating, and subsequently rubbed with a non-fluff cloth to induce a specific orientation of the polyimide alignment layer, which subsequently determines the orientation of the liquid crystal molecules placed upon the layer.

However, if a substrate on which the liquid crystal molecules have to be oriented is curved (or otherwise shaped, e.g., with a step structure) rubbing of the substrates is often irreproducible. Further, creating suitably shaped substrates with a specific desired curvature is relatively difficult and expensive.

Lenticulars include convex lenses that magnify light through a prism effect. Such lenses may be produced by providing a cavity in the shape of the lenses and employing a birefringent material such as liquid crystal therein. Employing liquid crystal permits the lenticular to become a switchable lenticular based upon an electric field applied to the liquid crystal material.

In the case of switchable lenticulars, a lenticular structure is often laminated to or replicated on a substrate made of glass followed by a polyimide spin coating of the structure. The structure is then baked and followed by rubbing of the polyimide to set an orientation of the liquid crystal. Such processing excludes the use of lenticular foils, since using such foils will become a source introducing unwanted curvature to the lenticulars, and causing several failure mechanisms to be initiated. This is often as the result of different coefficients of expansion between the glass of the substrate and the foil material, among other things.

For example, the difference in coefficients of thermal expansion between polymer foils and the glass plate or substrate will be a source of stress from higher curvature due to expansion and contraction as a result of changes in temperature. The different expansion and contraction rates between the polymer lenticular structure and the glass can cause many issues during processing and during the product's lifetime. The higher or lower the thermal coefficient difference is, the higher the curvature of the lenticulars. At some point a large curvature will cause a yield problem during processing. The higher the curvature, the higher the stress is in the material of the structure. Serious failure problems may ensue.

It therefore would be advantageous to provide a manufacturing process and device that enables the use of lenticular foils yet reduces lenticular curvature.

In accordance with present principles, a method for fabricating lenticulars includes applying a rubbing layer on a lenticular structure. The rubbing layer is baked on the lenticular structure before installation/applying of the lenticular structure on a plate. After baking, the lenticular structure is applied to the plate.

Another method for fabricating a display having switchable lenticulars includes: applying a rubbing layer on a lenticular foil having convex lenticular shapes formed therein, baking the rubbing layer on the lenticular foil before installation of the lenticular foil on a top plate of the display such that the lenticular foil is unconstrained during the baking, after baking, applying the lenticular foil when cooled to the top plate, rubbing the rubbing layer, filling the convex lenticular shapes in the lenticular foil with liquid crystal material, applying a substrate with a second rubbing layer to seal the liquid crystal in the lenticular cavities to form lenticulars, forming electrodes adjacent to the lenticulars for altering an electric field to permit switching of the lenticulars and providing a display portion to illuminate the switchable lenticulars using pixels and control switching operations of the lenticulars.

These and other objects, features and advantages of the present disclosure will become apparent from the following detailed description of illustrative embodiments thereof, which is to be read in connection with the accompanying drawings.

This disclosure will present in detail the following description of preferred embodiments with reference to the following figures wherein.

Present embodiments are directed to lenticular structures and methods for fabricating such structures where lenticular curvature is reduced. In particularly useful methods, lenticular foils may be employed during the processing of a switchable lenticular structure. Advantageously, the present methods reduce the curvature of lenticulars, permit the use of polymer foils during processing, and prevent exposure of functional layers to high temperatures. In accordance with this disclosure, baking of a polymer lenticular structure is performed prior to the structure being laminated to a substrate (e.g., glass plate). A display screen that employs a polymer lenticular foil is advantageously provided, stress and curvature are reduced, and yield is increased.

It should be understood that the present principles will be set forth in terms of switchable lenticulars; however, the teachings of the present embodiments are much broader and are applicable to any lenticulars or lens components, e.g., GRIN lenses or lenticulars or other devices having thin layers, such as, solar cells. The materials described herein may be substituted with other suitable materials. It should also be understood that the illustrative example of the processing sequence may be adapted to include additional steps to complete a display device or a portion thereof. The elements depicted in the FIGS. may be implemented in various combinations of hardware and provide functions which may be combined in a single element or layer or multiple elements or layers. In addition, while the lenticular structures may preferably employ liquid crystal material, the main display device may employ any type of display technology including but not limited to LCD, or other pixel matrix display types.

Figure 1:
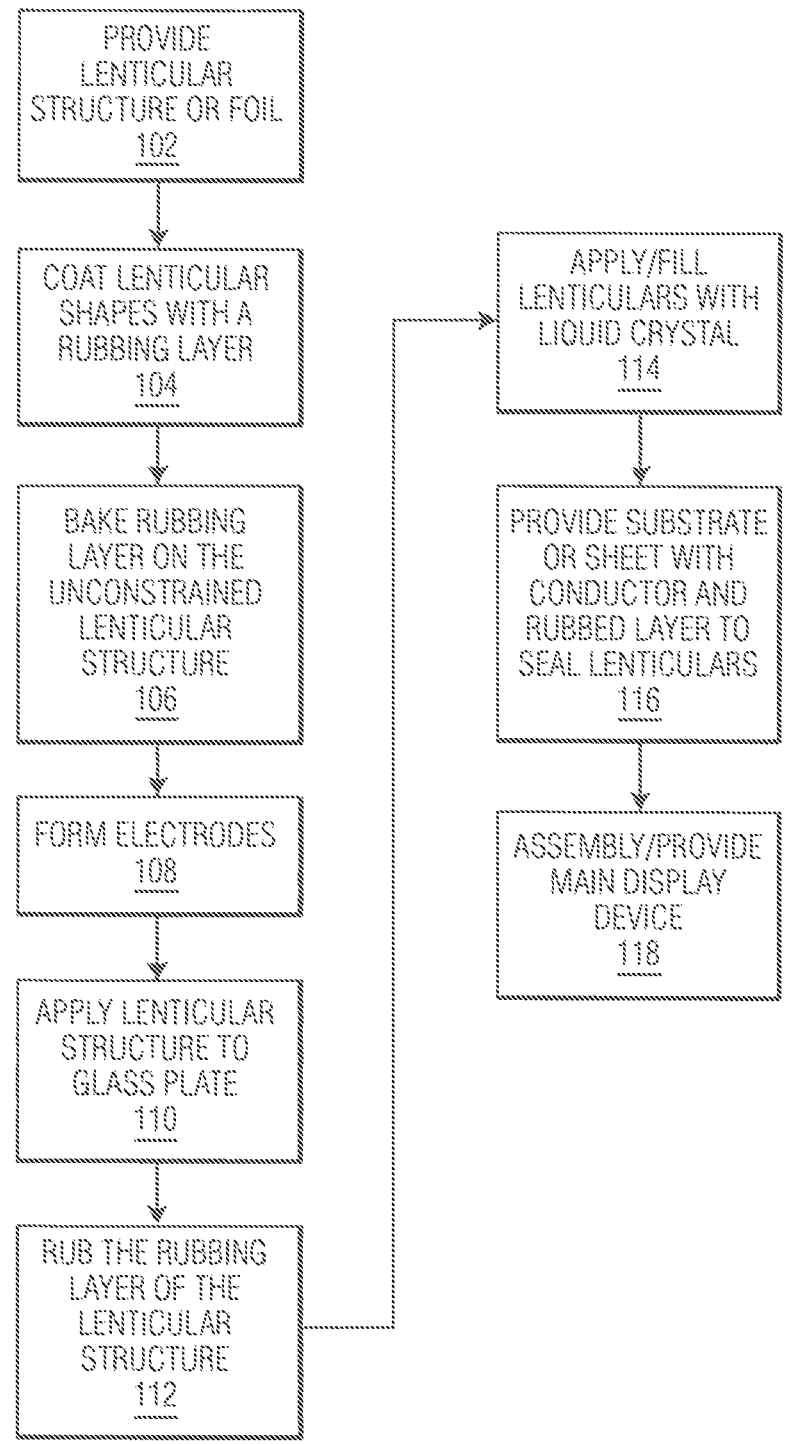
FIG. 1 is a flow diagram showing a method for fabricating a switchable lenticular structure which may be employed in a display screen, e.g., a liquid crystal display screen in accordance with the present principles.

Referring now to the drawings in which like numerals represent the same or similar elements and initially to FIG. 1, a flow diagram shows steps for fabricating a display device with switchable lenticulars. In block 102, a lenticular structure, foil or sheet is provided. The lenticular structure may include a foil or sheet or a fixed replica structure. The replica structure may include a side having lenticular shapes formed opposite a flat side. Foils can be manufactured using known technologies such as hot embossing, UV curing, casting, etc.

In block 104, the lenticular shapes are coated with a rubbing layer (e.g., a polymer). In one embodiment, the polymer includes polyimide, and is spun or printed onto the lenticular structure. Other materials may be employed instead of or in addition to polyimide. It should be noted that the present method may provide a benefit in fabrication processes for any other thin layer material known from lithography, printing, etc. that needs additional high temperature steps to complete processing of that particular layer, as will be described hereinafter.

In block 106, the lenticular structure with the rubbing layer applied thereon is baked. Advantageously, the baking is performed on the rubbing layer where the lenticular structure is unconstrained. Other layers or portions of a display device stack are not involved in the heating process and are therefore not subjected to the stresses and degradation that may be caused by heating. The lenticular structure is permitted to expand and contract freely (unconstrained). Heat sensitive portions of the display device are advantageously spared from exposure to this heating process. The heating process may include a bake temperature of between about 120 degrees Centigrade to about 180 degrees Centigrade. Temperature and heating times depend on the type of polymer employed. In one example, for polyimide in accordance with a preferred embodiment, heating time may be about 15 minutes. For other polyimide types, however, bake temperature can be as high and heating time can be as long as the underlying polymer foil permits. The bake temperature for some types of foils can be up to 350 degrees Centigrade. Other temperatures and appropriate bake times will depend on the application and material selection.

In block 108, conductive layers, e.g., ITO, are formed adjacent to the lenticulars (e.g., on the foil, on the glass substrate or both depending on the desired structure and application). The conductive layers form electrodes for applying electric fields to the liquid crystal material that will be employed in the lenticulars.

In block 110, the lenticular structure is laminated to a glass plate or substrate. The plate is preferably a top plate of the display screen or connected to the top plate which may be employed to protect the display. The distance of the lenticular structure to the color pixels in the display (focal point/distance) depends on the design. Therefore, for large screen sizes an intermediate plate (distance plate) may be employed. For small displays (e.g., portable types), the lenticular structure can be attached directly to the display glass (top plate) as described (or to a polarizer foil, which is the top layer in an LCD). The glass plate is preferably transparent. Applying the lenticular structure to the glass plate preferably includes applying the adhesive to a flat side of the lenticular structure (e.g., in this case, opposite the convex lenticular shapes), aligning the substrate with the lenticular structure and joining the two portions (or applying the adhesive substrate to the display glass). It is preferable that the lenticular structure be cooled before applying the structure to the plate, or alternately, the plate and the lenticular structure should be at the same temperature (preferably the temperature at which the structure will be operating.

It should be understood that the lenticular structure may include other layers, which may be added to the surface of the lenticular structure. For example, a conductive material such as, indium tin oxide (ITO) or the like, may be applied to the flat side of the lenticular structure to provide an electrode to control liquid crystal that will be disposed in the lenticular cavities to form a switchable lenticular structure. The lenticular structure may include other orientations and may include a plurality of patterns and structures.

In block 112, after the lenticular structure with the polymer (e.g., polyimide) layer is adhered to the substrate, the rubbing layer is rubbed to provide a molecular orientation for liquid material that will be in contact with the polyimide during operation of the display device. Rubbing typically includes employing a mesh or fabric type of material and rubbing the polyimide layer in a predetermined way. Rubbing techniques are known in the art.

In block 114, convex cavities of the lenticular structure are filled with liquid crystal material and enclosed to seal in the liquid crystal material. In block 116, the liquid crystal cells are enclosed using a sheet or substrate employed to seal the liquid crystal. This sheet preferably includes a rubbed layer (e.g. polyimide) in contact with the liquid crystal. The sheet or substrate may also include a conductive layer (e.g., ITO) to form and electrode for orienting the liquid crystal during operation (see block 110). Block 114 and 116 may have their order switched. For example, first create cavity, then fill the cavity with LC-liquid. This depends on design/processing specifications.

In block 118, processing continues to form the remaining portions of a display device. The lenticular portion of the display may be manufactured separately of as part of the entire display structure. A main display structure is coupled with the lenticular portion. The main display structure may include a liquid crystal display with pixels, activating transistors, addressing lines, backlight, etc. Other display types may also be employed.

The main display device may include control circuitry to control switching operations of the lenticulars. The switching operations may be carried out for different effects and results. The switchable lenticular structure enables different modes of operation for display devices. In one application, the lenticulars provides a first state in a three-dimensional (3D) mode and a second state in a two-dimensional (2D) mode.

Figure 2:
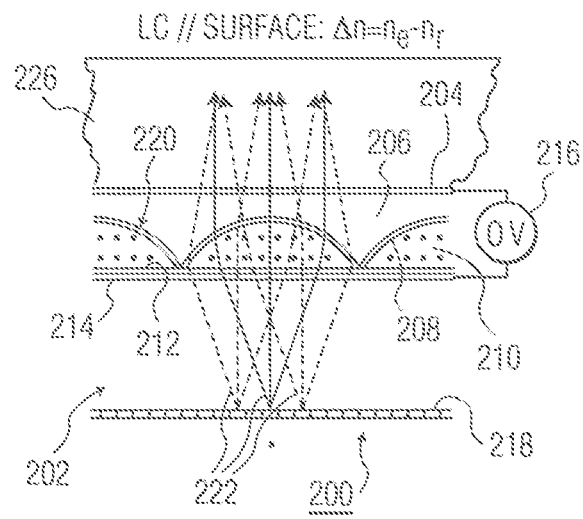
FIG. 2 is a cross-sectional view of a display device showing a three-dimensional mode generated using one mode of the switchable lenticulars in accordance with present principles.
Figure 3:
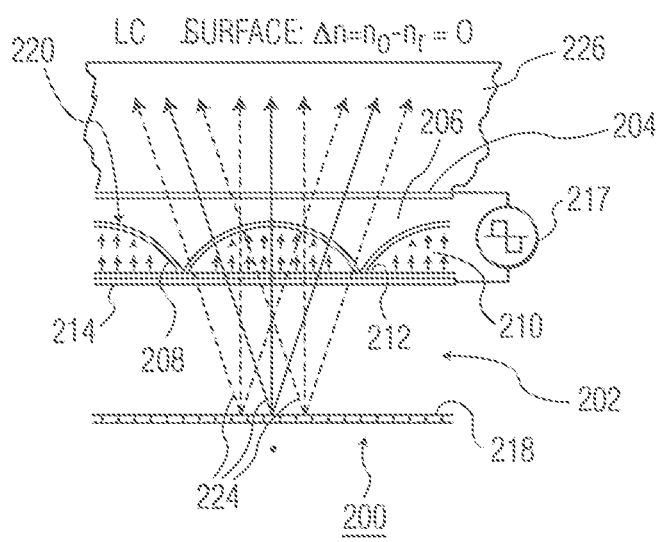
FIG. 3 is a cross-sectional view of a display device showing a two-dimensional mode generated using one mode of the switchable lenticulars in accordance with present principles.

Referring to FIGS. 2 and 3, cross-sectional views of a display device 200 having switchable lenticulars 220 in a three-dimensional (3D) image (FIG. 2) mode and a two-dimensional (2D) image mode (FIG. 3) are illustratively shown. In the three-dimensional mode, liquid crystal 210 is oriented in a parallel direction to rubbed surfaces 208 and 212. As a result of the parallel orientation, a non-zero difference in index of refraction is provided by lenticulars 220. The change in index of refraction is $\Delta n = n_e - n_r$, where $n_e$ is the extraordinary refractive index and $n_r$ is the effective index of refraction. FIG. 2 shows the optical effect in the "on" condition, while FIG. 3 shows the optical effect in the "off" condition. In the "on" 3D mode, the lens focusing (shown schematically) can be seen to be effected. The images of the different pixels associated with the lens are directed in mutually different directions towards a viewer's eyes by virtue of the lens action of the lenticular element so that a viewer sees a different pixel column in each eye. The lens action of the lenticular element forms an image of adjacent pixel columns close to the eye positions. In the "off" 2D mode, the lens action is removed and the viewer sees the image of all pixels with each eye.

Referring to FIG. 2, during operation, when a voltage 216 across a first electrode 204 and a second electrode 214 is zero, the liquid crystal 210 is in a parallel orientation causing a change is refractive index. This refracts light 222 coming from a pixel array 218 in accordance with the lenticular shape to simulate a three-dimensional image.

Lenticulars 220 are formed in a replica layer or as a foil 206 which provides the overall shape of the lenticulars 220. Layer 206 is coated with rubbed layer 208 (e.g., polyimide). Liquid crystal 210 is captured between rubbed layers 208 and 212. A main display portion or assembly 202 may contact conductive layer 214. Main display portion 202 may include a complete display device which may be integrated with lenticular structure or separately formed.

Referring to FIG. 3, a cross-sectional view of a display device 200 having switchable lenticulars 220 in a two-dimensional image mode is illustratively shown. In this mode, liquid crystal 210 is oriented in a perpendicular direction to rubbed surfaces 208 and 212. As a result of the perpendicular orientation, a zero difference between the index of refraction ($n_r$) and the ordinary refractive index ($n_o$), with the difference between these being $\Delta n = n_o - n_r = 0$ (i.e., $n_o = n_r$) where $n_o$ is the ordinary refractive index and $n_r$ is the effective index of refraction.

During operation, when a voltage 217 across a first electrode 204 and a second electrode 214 is non-zero, the liquid crystal 210 is in a perpendicular orientation causing a constant refractive index condition. This causes light 224 coming from pixel array 218 to be evenly dispersed in all directions to provide a two-dimensional image.

The device 200 includes the capability of switching between the three-dimensional mode and the two-dimensional mode. Advantageously, the structure of FIGS. 2 and 3 may include a lenticular sheet or foil 206 that has a polyimide or other rubbing layer heat treated prior to installation into the assembly 202. In this way, lenticular shapes 220 do not suffer from heat-induced stresses as a result of difference in the coefficient of thermal expansion between a (e.g., glass) substrate 226 and the replica layer 206 during heating. Previous devices were unable to employ lenticular foils due to the damaging effects of baking needed for preparing the rubbing layers formed on the lenticular sheets.

Illustrative applications of the display device according to this disclosure include a liquid crystal display for electronic devices, such as computers, personal digital assistants, cellular phones, video players/recorders, appliances, or any other device. Other applications and structures are also contemplated.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) no specific sequence of acts is intended to be required unless specifically indicated.

Having described preferred embodiments for curvature reduction for switchable polymer lenticulars (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the embodiments disclosed herein as outlined by the appended claims. Having thus described the details and particularity required by the patent laws, what is claimed and desired protected by Letters Patent is set forth in the appended claims:

The invention claimed is:

1. A method for fabricating lenticulars, comprising the acts of:
   applying a rubbing layer on a lenticular foil having lenticular cavities, wherein the lenticular foil is unattached to a plate having a coefficient of thermal expansion different from the lenticular foil;
   baking the rubbing layer on the lenticular foil in an unconstrained condition before installation of the lenticular foil on the plate;
   after baking, applying the lenticular foil to the plate;
   rubbing the rubbing layer;
   filling the lenticular cavities in the lenticular foil with liquid crystal material;
   applying a substrate with a second rubbing layer to seal the liquid crystal in the lenticular cavities to form lenticulars;
   forming electrodes adjacent to the lenticulars for altering an electric field to permit switching of the lenticulars, and
   providing a display portion to illuminate the switchable lenticulars using pixels and control switching operations of the lenticulars.

2. The method as recited in claim 1, further comprising rubbing the second rubbing layer.

3. The method as recited in claim 1, wherein the rubbing layer includes polyimide and the act of baking includes applying a temperature of between about 120 to about 180 degrees Centigrade.

4. The method as recited in claim 1, wherein the plate includes a glass plate and the act of applying the lenticular foil includes laminating the lenticular foil to the glass plate.

5. The method as recited in claim 1, wherein the lenticulars include switchable lenticulars, the method further comprising the act of forming conductive electrodes to switch modes of the lenticulars.

6. The method as recited in claim 1, wherein the act of applying a rubbing layer includes one of printing and spinning on the rubbing layer.

* * * * *